United States Patent [19]

Lee

[11] Patent Number: 5,657,178

[45] Date of Patent: Aug. 12, 1997

[54] TAPE POSITION AND REEL ROTATION DETECTION METHOD FOR VIDEO CASSETTE TAPE RECORDER

[75] Inventor: Sang Yong Lee, Seoul, Rep. of Korea

[73] Assignee: LG Electronics Inc., Seoul, Rep. of Korea

[21] Appl. No.: 575,614

[22] Filed: Dec. 20, 1995

[30] Foreign Application Priority Data

Dec. 21, 1994 [KR] Rep. of Korea ............... 6-035676

[51] Int. Cl.$^6$ ............................................. G11B 15/08
[52] U.S. Cl. ............................. 360/74.6; 360/73.04
[58] Field of Search ............................ 360/74.6, 74.5, 360/73.14, 71, 69, 74.1, 73.04; 242/333, 333.1, 333.2, 333.6, 333.7, 334, 334.2, 334.3, 334.4

[56] References Cited

U.S. PATENT DOCUMENTS 4,996,541  2/1991  Mori et al. ........................ 242/334

FOREIGN PATENT DOCUMENTS

| 119568 | 9/1984 | European Pat. Off. . | |
| 56-145543 | 11/1981 | Japan | 360/74.6 |
| 6-12730 | 1/1994 | Japan | 360/74.6 |
| 90/13119 | 11/1990 | WIPO . | |

OTHER PUBLICATIONS

English language abstract of JP 6012730, Jan. 21, 1994.
English language abstract of JP 6044639, Feb. 18, 1994.
English language abstract of JP 6036419, Feb. 10, 1994.
English language abstract of JP 3230347, Oct. 14, 1991.

*Primary Examiner*—Aristotelis M. Psitos
*Assistant Examiner*—James L. Habermehl
*Attorney, Agent, or Firm*—Birch, Stewart, Kolasch & Birch, LLP

[57] ABSTRACT

An improved tape position and reel rotation detection method for a VCR capable of detecting top and end positions of a tape, a supply reel rotation, and a take-up reel rotation by alternatively performing a tape position detection operation and a reel rotation detection operation, which includes the steps of: a first step which turns off tape position detection light emitting devices and first and second reel rotation detection light emitting devices for a first certain time at an initial stage of a reproducing or recording mode; a second step which turns on the first and second reel rotation detection light emitting devices for a second certain when the first certain time is lapsed, detects the rotation of a take-up reel for a certain time of the second certain time, and detection the rotation of a supply reel for a certain time; a third step which, after the second certain time is lapsed, turns off the first and second reel rotation detection light emitting devices, which are in a turned-on state, for a third certain time; a fourth step which, after the third certain time is lapsed, turns on the tape position light emitting device for a fourth certain time, detects a start position of the tape for a certain time of the fourth certain time, and a detects an end portion of the tape for a certain time; and a fifth step which executes the first through fourth steps after a fourth certain time is lapsed.

1 Claim, 7 Drawing Sheets

| | | LED13(TURN-ON) | | LED13 (TURN-OFF) |
|---|---|---|---|---|
| | | PT14 (TURN-ON) | PT14 (TURN-OFF) | PT14 (TURN-OFF) |
| LED11 (TURN-ON) | PT11 (TURN-ON) | X | X | "L" |
| | PT11 (TURN-OFF) | X | X | "H" |
| (TURN-OFF) LED11 | PT11 (TURN-OFF) | 'L' | 'H' | XX |

FIG. 8B

|  |  | LED12(TURN-ON) | | LED12 (TURN-OFF) |
|---|---|---|---|---|
|  |  | PT13 (TURN-ON) | PT13 (TURN-OFF) | PT13 (TURN-OFF) |
| LED11 (TURN-ON) | PT12 (TURN-ON) | X | X | "L" |
|  | PT12 (TURN-OFF) | X | X | "H" |
| (TURN-OFF) LED11 | PT12 (TURN-OFF) | 'L' | 'H' | XX |

FIG. 9

TAPE POSITION AND REEL ROTATION DETECTION METHOD FOR VIDEO CASSETTE TAPE RECORDER

BACKGROUND OF THE INVENTION

1. Field of the Invention

The present invention relates to a tape position and reel rotation detection method for a video cassette tape recorder (VCR) capable of detecting top and end positions of a tape, a supply reel rotation, and a take-up reel rotation by alternatively performing a tape position detection operation and a reel rotation detection operation and by time-sharing a detection signal with respect to the tape position detection operation and the reel rotation detection operation, thus reducing the number of input ports of a microprocessor.

2. Description of the Conventional Art

Figure 1:
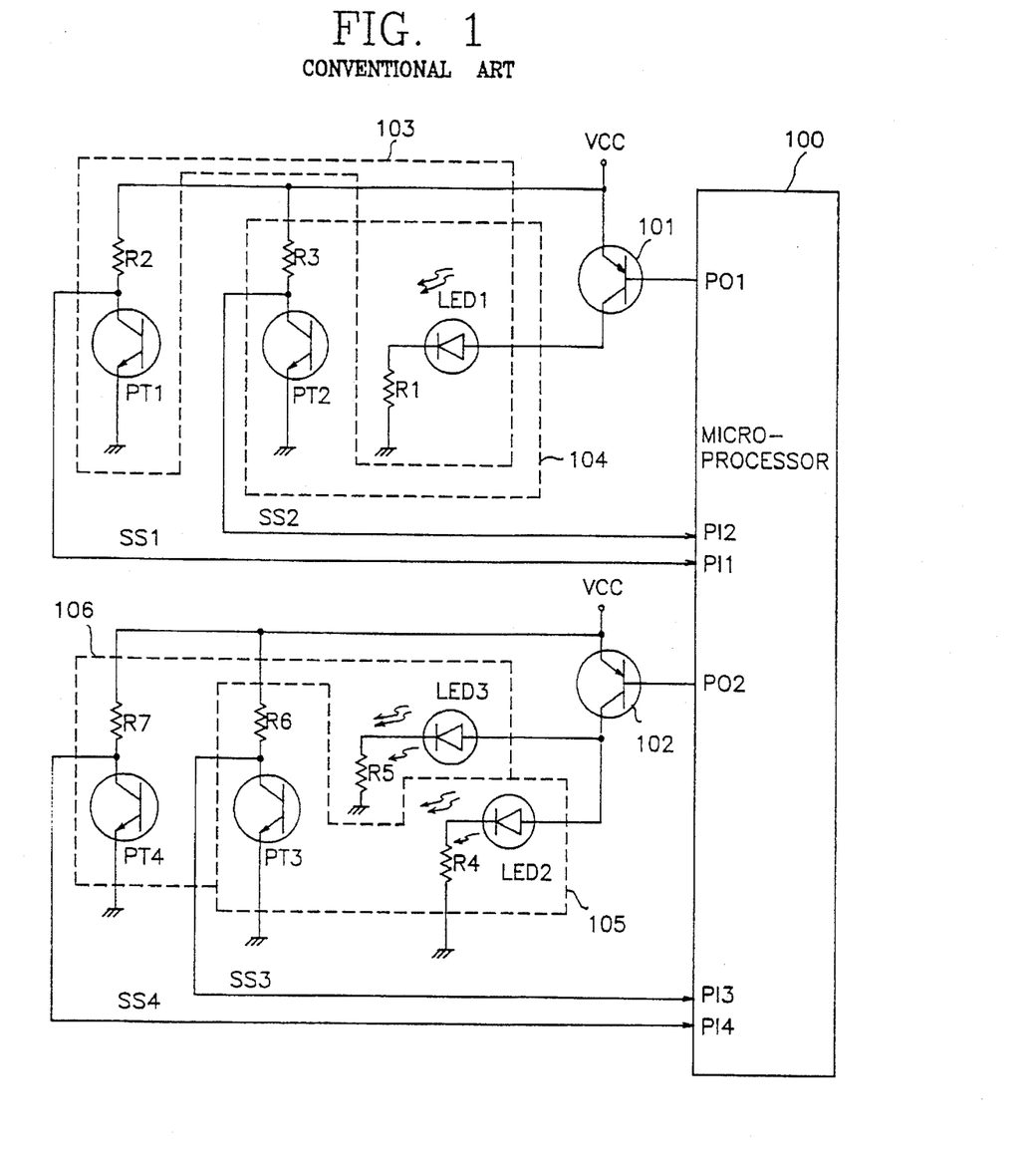
FIG. 1 is a circuit diagram of a tape position detection and reel rotation detection apparatus for a conventional VCR.

FIG. 1 shows a tape position and reel rotation detection apparatus of a conventional VCR, which includes a microprocessor 100 for generating a series of pulses, detecting detection signals SS1 through SS4 inputted to first through fourth input ports PI1 through PI4, and detecting top and end positions of a tape and a supply reel rotation, a first switching device 101 for periodically switching in accordance with a pulse outputted from the microprocessor 100 and for outputting a signal corresponding to the switching, a start detection position detection unit 103 for detecting a start position of the tape in accordance with a signal outputted from the first switching device 101 and for outputting a detection signal SS1 to the start position detection unit 103 of the microprocessor 100, an end position detection unit 104 for detecting an end position of the tape in accordance with a signal outputted from the first switching device 101 and for outputting a detection signal SS2 to the second input port PI2 of the microprocessor 100, a second switching device 102 for periodically switching in accordance with a pulse outputted from the microprocessor 100 and for outputting a signal corresponding to the switching, a supply reel rotation detection unit 105 for detecting the rotation of the supply reel in accordance with a signal outputted from the second switching device 102 and for outputting a detection signal SS3 to the input port PI3 of the microprocessor 100, and a take-up reel rotation detection unit 106 for detecting the rotation of the take-up reel in accordance with a signal outputted from the second switching device 102 and for outputting a detection signal SS4 to the fourth input port PI4 of the microprocessor 100.

The start position detection unit 103 includes a first light emitting device LED1 mined on in accordance with a signal outputted from the first switching device 101 and for emitting light signal, and a first light receiving device PT1 for detecting a start position of the tape at the time of receiving light of a light signal transmitted from the first light emitting device LED1 and for outputting a detection signal SS2 to the second input port PI2 of the microprocessor 100.

The supply reel rotation detection unit 105 includes a second light emitting device LED2 turned on in accordance with a signal outputted from the second switching device 102 and for outputting light signal, and a third light receiving device PT3 for detecting the rotation of the supply reel in accordance with a light signal outputted from the second light emitting device LED2 and for outputting a detection signal SS3 to the third input port PI3 of the microprocessor 100.

The take-up reel rotation detection unit 106 includes a third light emitting device LED3 turned on in accordance with a signal outputted from the second switching device 102 and for outputting light signal, and a fourth light receiving device PT4 for detecting the rotation of the take-up reel in accordance with a light signal transmitted from the third light emitting device LED3 and for outputting a detection signal SS4 to the fourth input port PI4 of the microprocessor 100.

Figure 5:
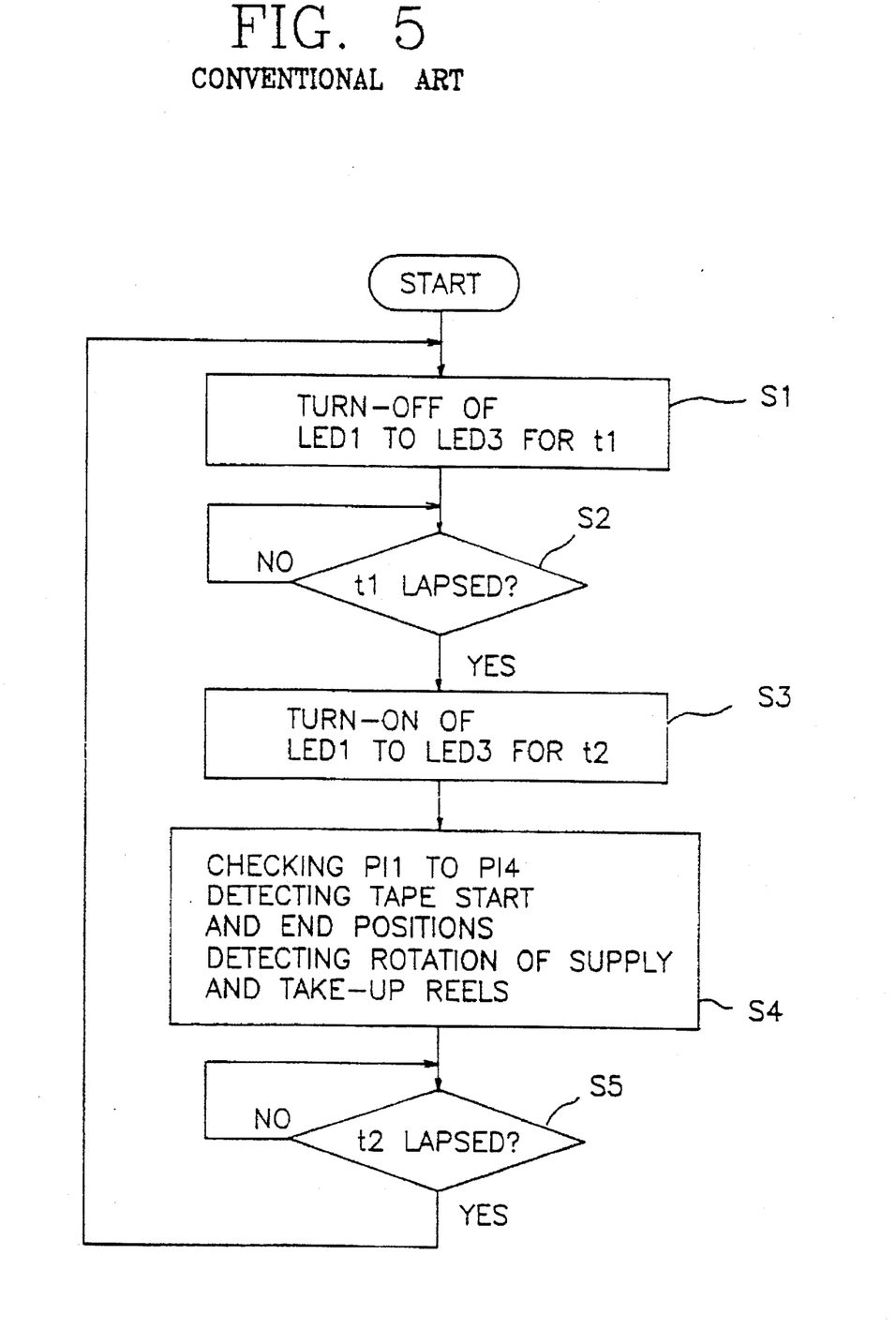
FIG. 5 is a flow chart of a tape position and reel rotation detection method of a conventional VCR.

In addition, FIG. 5 shows a flow chart of a tape position and reel rotation detection method for a conventional VCR, which includes the steps of a first step which turning off (S1) the first light emitting device LED1 through the third light emitting device LED3 for a predetermined time t1 at a reproducing mode or at a recording mode, a second step which turns on the light emitting device LED1 through the light emitting device LED3 for a predetermined time t2 after the predetermined time t1 is lapsed, detects the detection signals SS1 through SS4 inputted to the first through fourth input ports PI1 through PI4, and detects the start and end positions of the tape, the take-up reel rotation, and the supply reel rotation.

The operation of the tape position and reel rotation detection apparatus of a conventional VCR will now be explained with reference to the accompanying drawings.

Figure 2:
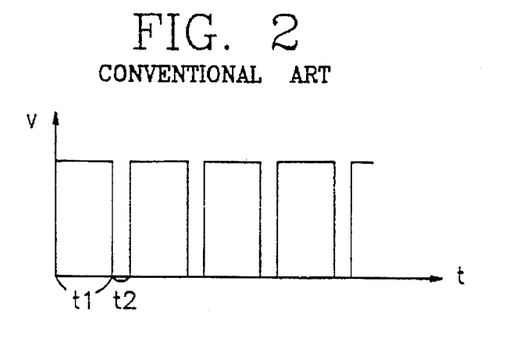
FIG. 2 is a wave form of an output signal of a microprocessor of FIG. 1.

To begin with, at the initial stage, the microprocessor 100 outputs a high level signal for a predetermined time t1 through the first and second output ports PO1 and PO2 as shown in FIG. 2.

Thereafter, the first switching device 101 is turned off in accordance with a signal outputted from the microprocessor 100, and the first light emitting device LED1 of the start position detection unit 103 and the end position detection unit 104 are turned off as the first switching device 101 is turned off.

In addition, the second switching device 102 is turned off in accordance with a high level signal outputted from the second output port PO2 of the microprocessor 100, and the second light emitting device LED2 of the supply reel rotation detection unit 105 and the third light emitting device LED3 of the take-up reel rotation detection unit 106 are turned off (S1), respectively, as the second switching device is turned off.

Thereafter, when a predetermined time t1 is lapsed, the microprocessor 100 outputs a low level signal for a predetermined time t2 through the first and second output ports PO1 and PO2.

As light signal is transmitted from the first light emitting device LED1, the first and second light receiving devices PT1 and PT2 detect the start and end positions of the tape in accordance with a light emitting state of the light signal.

Figure 3:
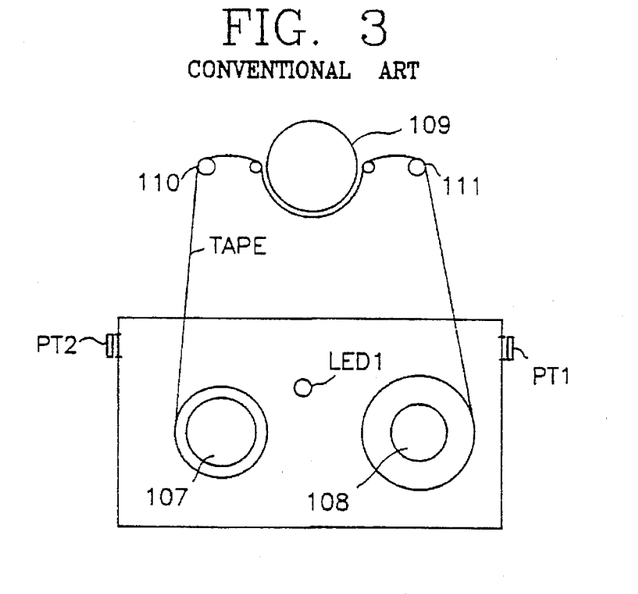
FIG. 3 is a schematic top view of a VCR deck of FIG. 1.

In more detail, while the tape is spooled from the supply reel 107 to the take-up reel 108 and wound onto the take-up reel 108 through post guides 110 and 111 and a drum 109, when a transparent part of the tape is appeared, the light signal transmitted from the first light emitting device LED1 passes through the transparent part of the tape, and is transmitted to the light receiving device PT1, and the first light receiving device PT1 is turned on.

As the first light receiving device PT1 is turned on, the first light receiving device PT1 outputs a low level detection signal SS1, and the microprocessor 100 detects (S4) the detection signal SS1 of a low level applied thereto through the first input port PI1 and detects the start position of the tape.

Thereafter, when the spool from the supply reel 107 to the take-up reel 108 is finished, that is, the transparent part appears, the light signal transmitted from the first light emitting device LED1 passes through the transparent part of the tape and is transmitted to the light receiving device PT2, and the microprocessor 100 detects (S4) a low level signal inputted to the second input port PI2 and detects the end position of the tape.

In addition, the switching device 102 is turned on in accordance with a low level signal outputted from the second output port PO2 of the microprocessor 100, and the second and third light emitting devices LED2 and LED3 are turned on (S3), respectively, and transmit light signals.

Figure 4:
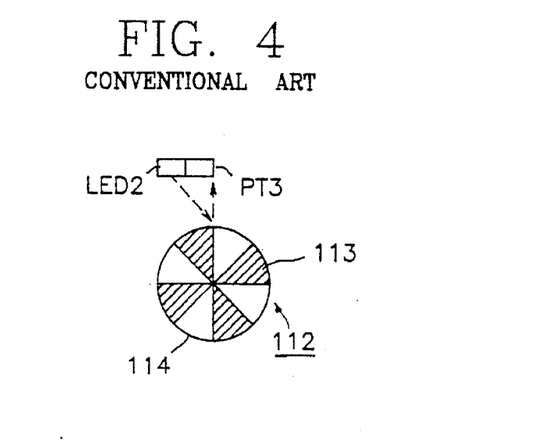
FIG. 4 is a view of a reel plate of a supply reel, a second light emitting device, and a third light emitting device of FIG. 1.

As shown in FIG. 4, the light signal transmitted from the second light emitting device LED2 is transmitted to the fourth light receiving device PT4 in cooperation with a receiving plate 113 and a reflection plate 114 of the supply reel plate 112. The light receiving device PT3 is turned off or turned on and outputs a high level signal or a low level signal to the third input port PO3 of the microprocessor 100.

Therefore, the microprocessor 100 detects (S4) the high level signal and the low level signal outputted from the light receiving device PT3 and detects the rotation of the supply reel.

In addition, since the fourth light receiving device PT4 has the same operation as the third light receiving device PT3, the microprocessor 100 detects the high level signal and the low level signal outputted from the fourth input port PI4 and detects the rotation of the take-up reel.

After a predetermined time t2 is lapsed, the microprocessor 100 performs the steps S1 through S4 and detects the start and end positions of the tape, the supply reel rotation and the take-up rotation.

However, the tape position and reel rotation detection method of a conventional VCR has disadvantages in that the number of input ports of the microprocessor is increased because the start and end positions of the tape and the supply reel and take-up reel rotations are detected by detecting detections signals with respect to the start and end positions of the tape and the supply reel and take-up reel rotations, respectively. In addition, in case of a VCR having various functions, additional microprocessor is necessary because of the lack of the number of ports.

SUMMARY OF THE INVENTION

Accordingly, it is an object of the present invention to provide a tape position and reel rotation detection method for a VCR, which overcome the problems encountered in a conventional tape position and reel rotation detection method for a VCR.

It is another object of the present invention to provide an improved tape position and reel rotation detection method for a VCR capable of detecting top and end positions of a tape, a supply reel rotation, and a take-up reel rotation by alteratively performing a tape position detection operation and a reel rotation detection operation and by time-sharing a detection signal with respect to the tape position detection operation and the reel rotation detection operation, thus reducing the number of input ports of a microprocessor.

To achieve the above objects, there is provided a tape position and reel rotation detection method for a VCR, which includes the steps of a first step which turns off tape position detection light emitting devices and first and second reel rotation detection light emitting devices for a first certain time at an initial stage of a reproducing or recording mode; a second step which turns on the first and second reel rotation detection light emitting devices for a second certain time when the first certain time is lapsed, detects the rotation of a take-up reel for a certain time of the second certain time, and detection the rotation of a supply reel for a certain time; a third step which, after the second certain time is lapsed, turns off the first and second reel rotation detection light emitting devices, which are in a turned-on state, for a third certain time; a fourth step which, after the third certain time is lapsed, turns on the tape position light emitting device for a fourth certain time, detects a start position of the tape for a certain time of the fourth certain time, and a detects an end portion of the tape for a certain time; and a fifth step which executes the first through fourth steps after a fourth certain time is lapsed.

DETAILED DESCRIPTION OF THE INVENTION

Figure 6:
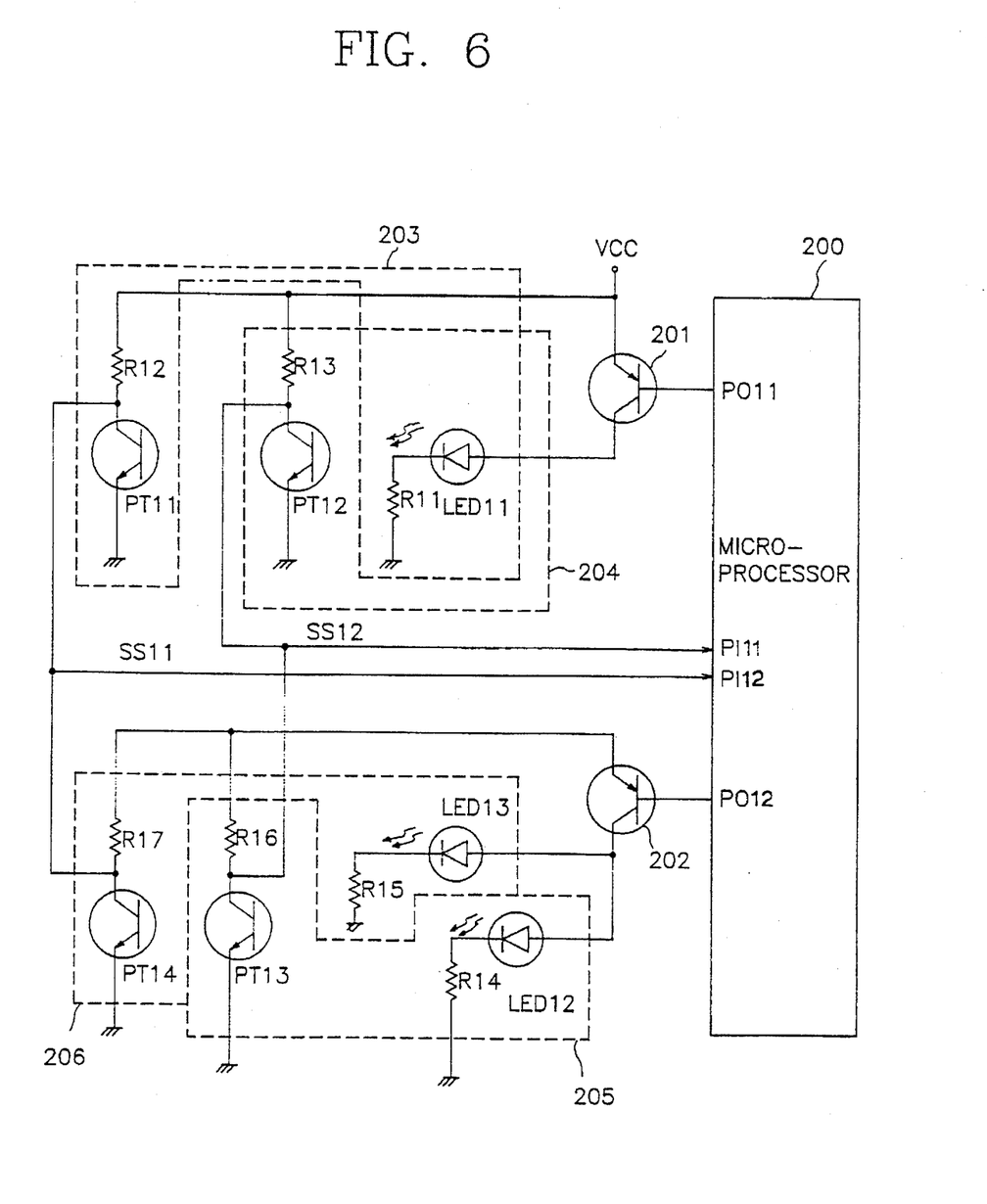
FIG. 6 is a circuit diagram of a tape position and reel rotation detection apparatus for a VCR according to the present invention.

FIG. 6 shows a tape position and reel rotation detection apparatus circuit diagram for a VCR according to the present invention, which includes a microprocessor 200 for outputting pulses each having a different phase through first and second output ports PO11 and PO12 for a certain time and for detecting detection signals S11 and S12 inputted to first and second input ports PI11 and PI12 in a time sharing manner and for detecting the start and end positions of a tape and a supply reel rotation and a take-up rotation, a first switching device 201 for switching in accordance with a pulse outputted from the first output port PO11 of the microprocessor 200 and for outputting a signal corresponding to the switching a start position detection unit 203 for detecting a start position of the tape in accordance with a signal outputted from the first switching device 201 and for outputting a detection signal SS1 corresponding to the detection, an end position detection unit 104 for detecting an end position of the tape in accordance with a signal outputted from the first switching device 201 and for outputting a detection signal SS12 corresponding to the detection, a second switching device 202 for switching in accordance with a pulse outputted from the second output port PO12 of the microprocessor 200 and for outputting a signal corresponding to the switching, a supply reel rotation detection unit 205 for detecting the rotation of the supply reel in accordance with a signal outputted from the second switching device 202 and for outputting a detection signal SS12 corresponding to the detection, and a take-up reel detection unit 206 for detecting the rotation of the take-up reel in accordance with a signal outputted from the second switching device 202 and for outputting a detection signal SS11 corresponding to the detection.

The start position detection unit 203 includes a first light emitting device LED11 turned on in accordance with a signal outputted from the first switching device 201 for outputting light signal, and a first light receiving device PT11 for detecting a start position of the tape in accordance with a light signal outputted from the first light emitting device LED11 and for outputting a detection signal SS1 corresponding to the detection to the first input port PI1 of the microprocessor 100.

In addition, the end position detection unit 204 includes a second light receiving device PT12 for detecting an end position of the tape in accordance with a light signal outputted from the first light emitting deice LED11 and for outputting a detection signal SS12 corresponding to the detection to the first input port PI12 of the microprocessor 100.

The supply reel rotation detection unit 205 includes a second light emitting device LED12 turned on in accordance with a signal outputted from the second switching device 202 for outputting a light signal, and a third light receiving device PT13 for detecting the rotation of the supply reel in accordance with a light signal outputted from the second light emitting device LED12 and for outputting a detection signal SS12 to the first input port PI11 of the microprocessor 200.

The take-up reel rotation detection unit 206 includes a third light emitting device LED13 turned on in accordance with a signal outputted from the second switching device 202 for outputting a light signal, and a fourth light receiving device PT14 for detecting the rotation of the take-up reel in accordance with a light signal outputted from the third light emitting device and for outputting a detection signal SS11 to the second input port PI12 of the microprocessor 200.

Figure 9:
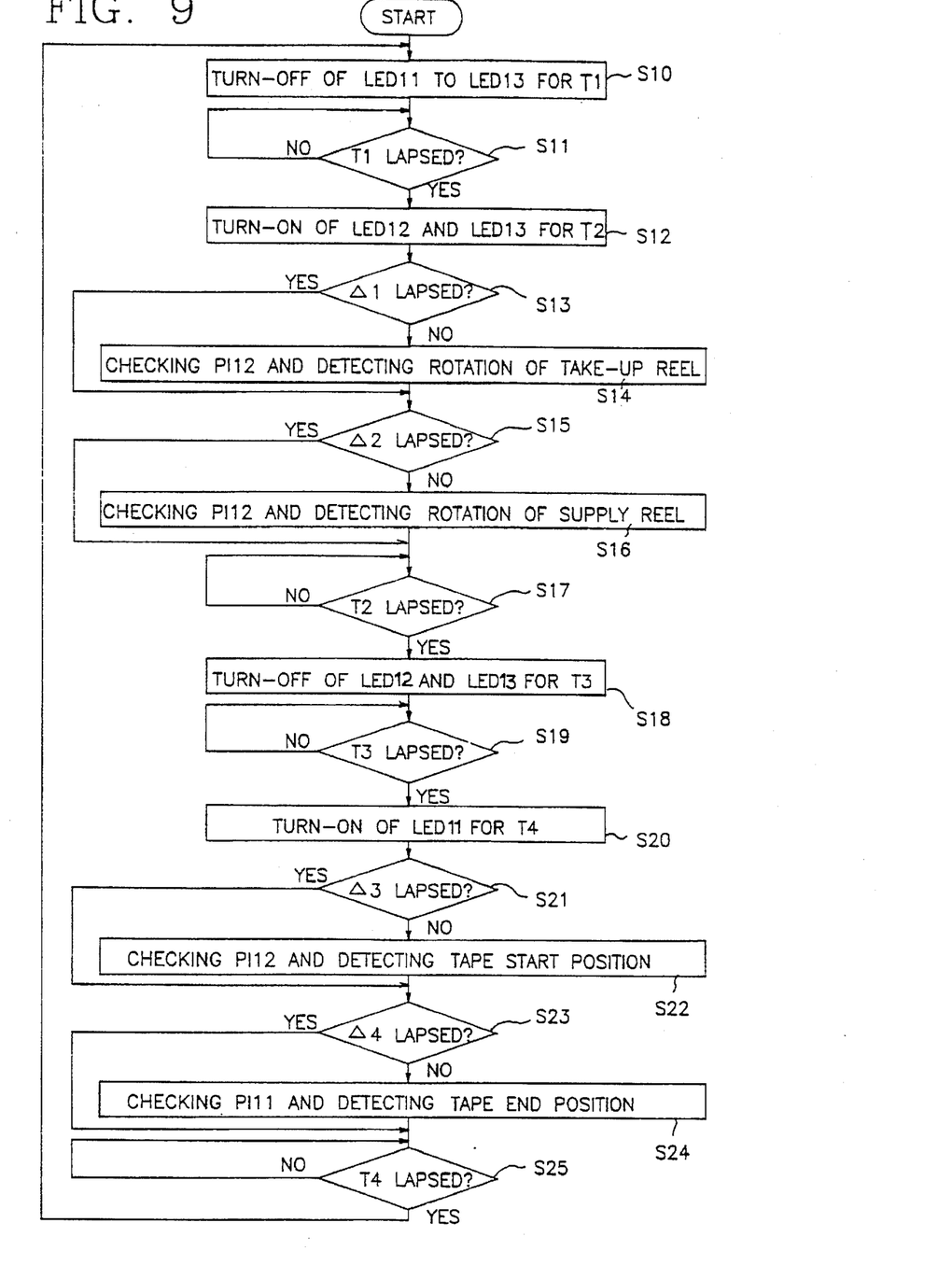
FIG. 9 is a flow chart of a tape position and reel rotation detection method for a VCR according to the present invention.

As shown in FIG. 9, a tape position and reel rotation detection method for a VCR according to the present invention includes the steps of a first step which turns off (S10) the first through third light emitting devices LED11 through LED13 for a certain time t1 at an initial stage, a second step which turns on (S12) the second and third light emitting devices LED12 and LED13 for a certain time t2 when the certain time t1 is lapsed (S11), and detects (S14) a detection signal SS11 inputted to the second input port PI12 for a certain time Δ1 of the certain time t2, and detects a detection signal SS12 inputted to the first input port PI11 for a certain time Δ2, and detects the rotation of the supply reel, a third step which turns off the second and third light emitting devices LED12 and LED13 for a certain time t3, a fourth step which turns on the first light emitting device LED11 for a certain time 14 when the certain time t3 is lapsed, and detects (S22) a start position of the tape by detecting a detection signal SS11 inputted to the second input port PI12 for Δ3 (S21), and detects an end position of the tape by checking a detection signal SS12 inputted to the first input port PI11 for a certain time Δ4 (S23), and a fifth step which performs the first through fourth steps when the certain time t4 is lapsed.

The operation of the tape position and reel rotation detection apparatus for a VCR according to the present invention will now be explained with reference to FIGS. 7 and 8.

Figure 7:
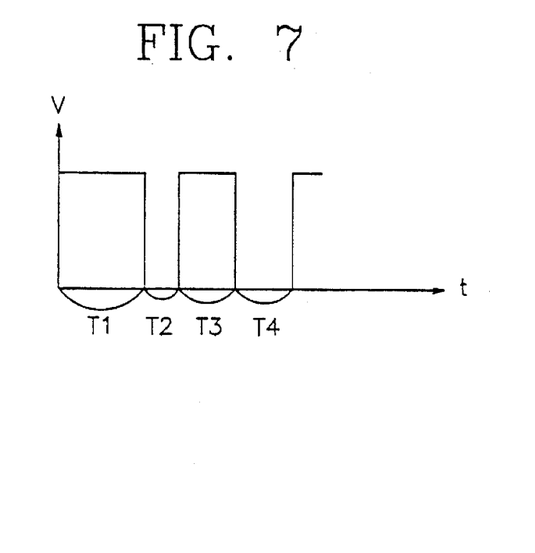
FIG. 7 is a wave form of an output signal of a microprocessor of FIG. 6.

To begin with, the microprocessor outputs a high level signal through the first and second output ports PO11 and PO12 for a certain time t1 at an initial stage of a recording mode or a reproducing mode as shown in FIG. 7.

the first and second switching devices 201 and 202 are turned off in accordance with a high level signal outputted from the microprocessor 200, and the first light emitting device LED11 through the third light emitting device LED13 are turned off (S10), respectively.

Figure 8A:
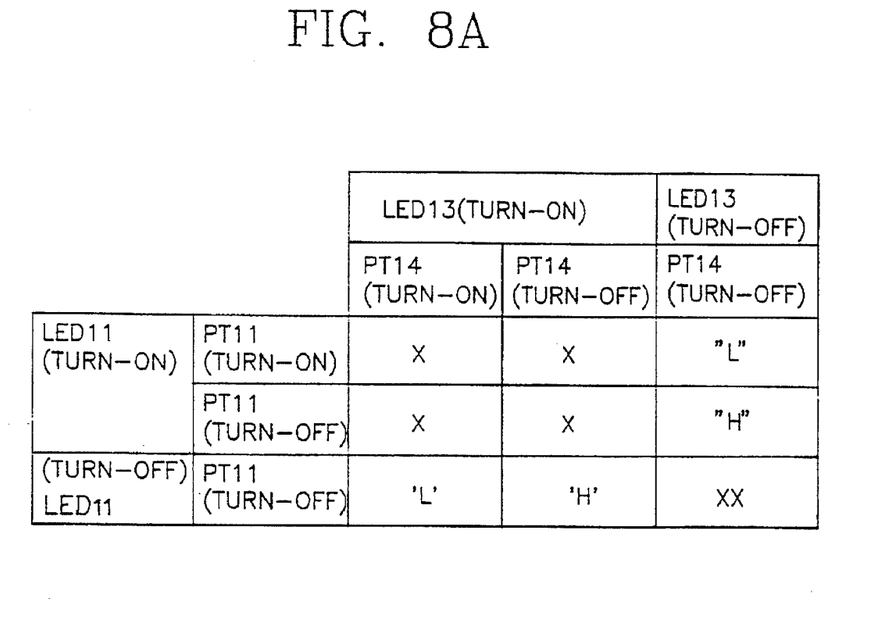
FIG. 8A is a table of a detection signal outputted from a second input port of a microprocessor of FIG. 6 according to the present invention.
Figure 8B:
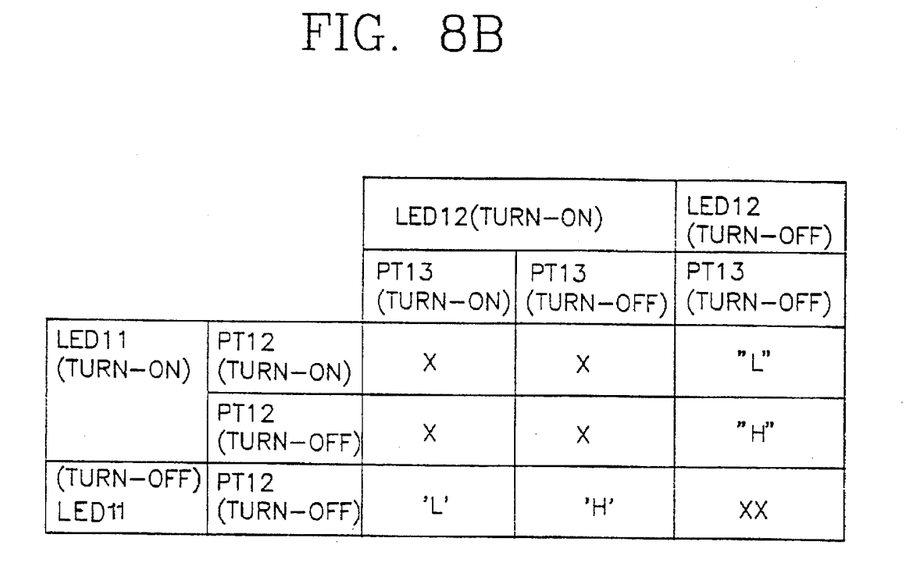
FIG. 8B is a table of a detection signal outputted from a first input port of a microprocessor of FIG. 6 according to the present invention.

At this time, the microprocessor 200 does not detect the detection signals SS12 and SS11 inputted to the first and second input ports PI11 and PI12 as indicated as the mark XX in FIGS. 8A and 8B.

Thereafter, after the certain time t1 is lapsed (S11), the microprocessor 200 outputs a low level signal through the second output port PO2 for a certain time t2 as shown in FIG. 7.

The second switching device 202 is turned on in accordance with a low level signal outputted from the second output port PO2 of the microprocessor 200, and the second and third light emitting devices LED12 and LED13 are mined on (S12), respectively, and output a light signal.

At this time, the first light emitting device LED11 maintains a turned-off state.

The light signal outputted from the second light emitting device LED12 is absorbed or reflected by an absorbing section or a reflecting section of the reel plate, or the light signal is not received by the third light receiving device pt13.

Therefore, as shown in FIG. 8B, the third light receiving device PT13 sequentially outputs a low level detection signal SS12 and a high level detection signal SS12 to the first input port PI11 in accordance with a light signal outputted from the second light emitting device LED12, and as shown in FIG. 8A the fourth light receiving device PT14 sequentially outputs a low level detection signal SS11 and a high level detection signal S11 to the second input port PI12 in accordance with a light signal outputted from the third light emitting device LED13.

Thereafter, the microprocessor 200 detects the rotation of the take-up reel by checking a detection signal SS11 outputted from the fourth light receiving device PT14 for a certain time Δ1 of the certain time t2.

The microprocessor 200 detects (S16) the rotation of the supply reel by checking the detection signal SS12 outputted from the third light receiving device PT13 for a certain time Δ2 (S15) of the certain time t2 after the certain time Δ1 is lapsed.

Thereafter, after the certain time t2 is lapsed (S17), the microprocessor 200 outputs a high level signal for a certain time t3 through the second output port PO12 as shown in FIG. 7, and turns off the second switching device 202, and the second and third light emitting devices LED12 and LED13 are turned off (S18), respectively.

At this time, the microprocessor 200 does not check the detection signals SS12 and SS11 outputted from the first and second input ports PI11 and PI12, respectively, as indicated as the mark XX in FIGS. 8A and 8B.

After the certain time t3 is lapsed, the microprocessor 200 outputs a low level signal for a certain time t4 through the first output port PO11 as shown in FIG. 7, and the first switching device 201 is turned on, and the first light emitting device LED11 is turned on.

At this time, the second and third light emitting devices LED12 and LED13 maintain a turned-off state, respectively.

When a transparent part of the tape appears while a spool from the supply reel to the take-up reel is completed, the first light emitting device PT11 receives a light signal transmitted from the first light emitting device LED11 through the transparent part, and outputs a detection signal SS11 of a low level, as shown in FIG. 8A, to the second input port PI12 of the microprocessor 200.

Thereafter, when a transparent part of the end of the tape appears, that is, the spool of the tape to the take-up reel is completed, the second light receiving device PT12 receives a light signal transmitted from the first light emitting device LED11 through the transparent part, and as shown in FIG. 8B outputs a detection signal SS12 of a low level to the first input port PI11 of the microprocessor 200.

The microprocessor 200 detects (S22) a start position of the tape by checking the detection signal SS11 of a low level applied to the second input port PI12 for a certain time Δ3 (S21) of a certain time t4.

The microprocessor 200 detects an end position of the tape by checking the detection signal SS12 of a low level applied to the first input port PI11 for a certain time Δ4 of the certain time t4 after the certain time Δ3 is lapsed.

Thereafter, when the certain time t4 is lapsed, the microprocessor 200 executes the steps S10 through S24.

Meanwhile, an occasion that the first through third light emitting devices LED1 through LED3 are turned on at the same time does not happen in this embodiment.

As described above, the tape position and reel rotation detection method for a video cassette tape recorder (VCR) is directed to detecting top and end positions of a tape, a supply reel rotation, and a take-up reel rotation by alternatively performing a tape position detection operation and a reel rotation detection operation and by time-sharing a detection signal with respect to the tape position detection operation and the reel rotation detection operation, thus reducing the number of input ports of a microprocessor.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A tape position and reel rotation detection method for a VCR, comprising the steps of:

a first step which turns off tape position detection light emitting devices and first and second reel rotation detection light emitting devices for a first certain time at an initial stage of a reproducing or recording mode;

a second step which turns on said first and second reel rotation detection light emitting devices for a second certain time when said first certain time is lapsed, detects the rotation of a take-up reel for a certain time of said second certain time, and detection the rotation of a supply reel for a certain time;

a third step which, after the second certain time is lapsed, turns off the first and second reel rotation detection light emitting devices, which are in a turned-on state, for a third certain time;

a fourth step which, after said third certain time is lapsed, turns on said tape position light emitting devices for a fourth certain time, detects a start position of the tape for a certain time of said fourth certain time, and detects an end position on the tape for a certain time; and a fifth step which executes said first through fourth steps after a fourth certain time is lapsed.

* * * * *